(12) United States Patent
Dantus

(10) Patent No.: US 12,332,116 B2
(45) Date of Patent: Jun. 17, 2025

(54) LASER SYSTEM WITH SELF-REFERENCING SHAPER

(71) Applicant: Board of Trustees of Michigan State University, East Lansing, MI (US)

(72) Inventor: Marcos Dantus, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 299 days.

(21) Appl. No.: 18/086,749

(22) Filed: Dec. 22, 2022

(65) Prior Publication Data

US 2023/0204431 A1 Jun. 29, 2023

Related U.S. Application Data

(60) Provisional application No. 63/294,485, filed on Dec. 29, 2021.

(51) Int. Cl.
*G01J 11/00* (2006.01)
(52) U.S. Cl.
CPC ..................................... *G01J 11/00* (2013.01)
(58) Field of Classification Search
CPC .... G01J 11/00; G02F 1/3517; G02F 2203/12; H01S 3/0085; H01S 3/0014; H01S 3/0057
See application file for complete search history.

(56) References Cited

U.S. PATENT DOCUMENTS

| | | | |
|---|---|---|---|
| 9,048,632 B1 | 6/2015 | Dantus et al. | |
| 11,502,473 B2 | 11/2022 | Dantus et al. | |
| 2003/0099264 A1 | 5/2003 | Dantus et al. | |
| 2004/0089804 A1 | 5/2004 | Dantus et al. | |
| 2004/0233944 A1 | 11/2004 | Dantus et al. | |
| 2005/0021243 A1 | 1/2005 | Dantus et al. | |
| 2006/0033923 A1* | 2/2006 | Hirasawa | H04B 10/503 356/450 |
| 2006/0056468 A1 | 3/2006 | Dantus et al. | |

(Continued)

OTHER PUBLICATIONS

Weiner, A., "Femtosecond Optical Pulse Shaping and Processing," Prog. Quant. Electr., vol. 19, p. 161 (1995).

(Continued)

*Primary Examiner* — Tarifur R Chowdhury
*Assistant Examiner* — Akbar H. Rizvi
(74) *Attorney, Agent, or Firm* — Harness, Dickey & Pierce, PLC

(57) ABSTRACT

A laser system and method include a self-referencing shaper. A self-referencing pulse shaper is provided in an embodiment. Another aspect of a laser system includes at least one beam splitter splitting a reference beam from a working beam and a test beam, a delay optic delaying a reference laser beam, an active shaper, an interferometer, and a (Continued)

programmable controller. In another aspect, a method includes splitting an input laser pulse into a reference pulse and a shaping pulse, controlling phase and amplitude of the shaping pulse with an adjustable pulse shaper, creating an optical delay of the reference pulse, comparing a test pulse and the reference pulse after the controlling and delay, the laser system characterizing the input laser pulse and monitoring the laser system's own dispersion in a self-referenced manner, and correcting an output working laser pulse by adjusting the pulse shaper based on the comparing step.

21 Claims, 6 Drawing Sheets

(56) References Cited

U.S. PATENT DOCUMENTS

| 2006/0187974 | A1 | 8/2006 | Dantus |
| 2008/0170218 | A1 | 7/2008 | Dantus et al. |
| 2009/0188901 | A1 | 7/2009 | Dantus |
| 2009/0207869 | A1 | 8/2009 | Dantus et al. |
| 2009/0238222 | A1 | 9/2009 | Dantus et al. |
| 2009/0296744 | A1 | 12/2009 | Dantus et al. |
| 2010/0123075 | A1 | 5/2010 | Dantus et al. |
| 2010/0187208 | A1 | 7/2010 | Dantus et al. |
| 2011/0211600 | A1 | 9/2011 | Dantus et al. |
| 2012/0076504 | A1 | 3/2012 | Dantus et al. |
| 2012/0147911 | A1 | 6/2012 | Dantus et al. |
| 2014/0058367 | A1 | 2/2014 | Dantus |
| 2016/0169806 | A1 | 6/2016 | Dantus et al. |
| 2018/0219346 | A1 | 8/2018 | Dantus et al. |
| 2018/0267072 | A1 | 9/2018 | Dantus et al. |
| 2020/0212643 | A1 | 7/2020 | Dantus et al. |
| 2023/0062860 | A1 | 3/2023 | Dantus et al. |

OTHER PUBLICATIONS

McCabe, D., et al., "Space-time coupling of shaped ultrafast ultraviolet pulses from an acousto-optic programmable dispersive filter," J. Opt. Soc. Am. B, vol. 28, No. 1 (Jan. 2011).

Fittinghoff, D., et al., "Practical advances in ultrashort-pulse measurement using frequency-resolved optical gating," Proceedings of SPIE 2801, Generation, Amplification, and Measurement of Ultrashort Laser Pulses III (May 8, 1996).

Froehly, C., "Shaping and Analysis of Picosecond Light-Pulses," Progress in Optics, vol. 20, pp. 65-153 (1983).

Park, Y., et al., "Characterization and Optimization of Optical Pulse Differentiation Using Spectral Interferometry," IEEE Photonics Technology Letters, vol. 18, No. 17 (Sep. 1, 2006).

Dorrer, C., et al., "Linear self-referencing techniques for short-optical-pulse characterization," J. Opt. Soc. Am. B, vol. 25, No. 6 (Jun. 2008).

Supradeepa, V., "Optical arbitrary waveform characterization via dual-quadrature spectral interferometry," Optics Express, vol. 17, No. 1 (Jan. 5, 2009).

Amir, W., et al., "Complete characterization of a spatiotemporal pulse shaper with two-dimensional Fourier transform spectral interferometry," Optics Letters, vol. 32, No. 8 (Apr. 15, 2007).

Oksenhendler, T., et al., "Self-referenced spectral interferometry," Applied Physics B Lasers and Optics, Appl Phy B, vol. 99, pp. 7-12 (2010).

Castro-Olvera, G., et al., "High speed femtosecond pulse characterization based on spectral interferometry," Opt. Pura Apl. vol 46(1), pp. 1-6 (2013).

Monmayrant, A., "A newcomer's guide to ultrashort pulse shaping and characterization," Journal of Physics B: Atomic, Molecular and Optical Physics, vol. 43, pp. 34 (2010).

Wyant, J., "A wonderful life of holography, interferometry, and optical testing," Proc. SPIE 10749, Interferometry XIX (Aug. 18, 2018).

* cited by examiner

LASER SYSTEM WITH SELF-REFERENCING SHAPER

CROSS-REFERENCE TO RELATED APPLICATIONS

This application claims priority to provisional patent application Ser. No. 63/294,485 filed on Dec. 29, 2021, which is incorporated by reference herein.

BACKGROUND AND SUMMARY

The present disclosure generally pertains to a laser system and more particularly to a system with a self-referencing shaper.

In 1983, a 4-f pulse shaper was first introduced which the author expressed as a "zero dispersion shaper;" see Froehly, C., "II Shaping and Analysis of Picosecond Light Pulses," Progress in Optics (1983), vol. 20, p. 63. This is due to the configuration of the grating and lenses thereof corresponding to a zero-dispersion compressor. The "zero dispersion shaper" phrase overgeneralization for traditional devices is not entirely accurate, however, since the optics themselves and precise placement of the optics determine the actual dispersion of the pulse shaper. For example, the use of a transmissive lens adds dispersion of the lens material itself, and the introduction of a phase mask material introduces additional dispersion. Even when reflective focusing elements are employed, the dispersion of the conventional pulse shaper is never zero at all wavelengths. This "so-called zero dispersion" misnomer is recognized in Weiner, Femtosecond Optical Pulse Shaping and Processing, Prog. Quant. Electr. (1995), vol. 19, p. 161 at 202.

Conventional pulse shapers can produce dispersion-free pulses at their output, but these pulse shapers do not characterize the input pulses because of the unknown spectral dispersion of the pulse shaper itself. To measure the dispersion of a pulse shaper in traditional devices, the manufacturer employs a very stable laser oscillator and a well-calibrated first pulse shaper that delivers transform limited ("TL") pulses to the second pulse shaper to be calibrated. Disadvantageously, such systems do not allow for on-site measurement since the specialized and expensive equipment cannot withstand shipment vibration and temperature changes. Furthermore, traditional approaches are not well suited for pre-shipping measurements of continuously used commercial setups which need to account for aging of optical components, misalignment, wavelength tuning and laser intensity changes during use, all of which affect dispersion correction.

It is noteworthy, however, that McCabe, D., et al., "Space-Time Coupling of Shaped Ultrafast Ultraviolet Pulses from an Acousto-Optic Programmable Dispersive Filter," J. Opt. Soc. Am. B (2011) vol. 28, teaches away from the present disclosure. McCabe states on its first page: "Fourier-transform interferometry (SSI) . . . is an interferometric technique that entails a relative measurement of the spectral phase between a reference and unknown pulse—it thus lends itself to the measurement of the transfer function of a pulse shaper. As a metrology tool, SSI is suited to low pulse energies since it does not necessitate any nonlinear processes. (In the event that knowledge of the spectral phase of the input pulse per se is required, absolute pulse characterization techniques may be applied . . . )"

The present inventor has invented various ultrafast laser systems which characterize and phase correct femtosecond laser pulses with an adaptive pulse shaper. Examples can be found in: U.S. Patent Publication No. 2020/0212643 entitled "Laser Apparatus Including an Optic Dispersion Compensator" which published to Dantus et al. on Jul. 2, 2020; U.S. Pat. No. 9,048,632 entitled "Ultrafast Laser Apparatus" which issued to Dantus et al. on Jun. 2, 2015; and U.S. Pat. No. 8,311,069 entitled "Direct Ultrashort Laser System" which issued to Dantus et al., on Nov. 13, 2012. All of these patents and patent publications are incorporated by reference herein.

In accordance with the present invention, a system and method include a self-referencing shaper. A self-referencing, laser pulse shaper is provided in one embodiment. Another aspect of a laser system includes at least one beam splitter splitting a reference beam from a working beam and a test beam, a delay optic delaying a reference laser beam, an active shaper, an interferometer, and a programmable controller. In another aspect, a method includes splitting an input laser pulse into a reference pulse and a shaping pulse, controlling phase and amplitude of the shaping pulse with an adjustable pulse shaper, creating an optical delay of the reference pulse, comparing a test pulse and the reference pulse after the controlling and delay, the laser system characterizing the input laser pulse and monitoring the laser system's own dispersion in a self-referenced manner, and correcting an output working laser pulse by adjusting the pulse shaper based on the comparing step. A further aspect provides a method including emitting an input laser beam, splitting the laser beam into an input reference path and an input shaping path, shaping the laser beam along the input shaping path, delaying the laser beam along the input reference path, receiving the shaped and delayed laser beams by interferometry, comparing the shaped and delayed laser beams to extract phase and amplitude variations of the shaped and delayed laser beams, automatically compensating for the variations by adjusting the shaping, emitting an output laser beam from the input test path, configured for workpiece interaction, substantially simultaneously with the shaping, delaying, receiving and comparing steps. A software program used with a laser system is also provided.

The present system and method are advantageous over convention devices. For example, the present system beneficially allows a user in a commercial or laboratory environment to diagnose a pulse of an input laser beam, to measure and characterize laser and/or shaper performance without distortions caused by dispersion or misalignment of the shaper. The present system advantageously employs a truly zero dispersion pulse shaper, which is self-referencing, allowing accurate measurement and characterization of both input and output pulses. Furthermore, the present system continuously monitors internal dispersion of the shaper and corrects for temperature drifts caused by the environment or by laser deposited thermal energy, which shortens system warmup time. Additionally, the present system self-corrects for changes in dispersion due to aging optics, such as when their optical properties differ over time in use from those when the optics are initially manufactured.

The present laser system and method are advantageous over traditional devices since the programmable controller and its software instructions provide calibration, real-time continuous monitoring, automatic shaper adjustment, and alert a user if the dispersion has changed outside a specified or desired range, if the system is out of alignment or the input laser is not functioning properly. Moreover, the present system provides a complementary method for monitoring and confirming an output phase and amplitude of the pulses, which is especially helpful for reproducibility and in metrology and to ensure reproducible laser material processing.

Another advantage is, with an additional reference and an additional controllable adjustment, the system can be used for stabilizing a carrier phase envelope of the output pulses. Comparing a measured interferogram with a calculated interferogram beneficially speeds up routine system performance for any phase setting. Additional advantages and features of the present system will become apparent with reference to the following description and claims, as well as the appended drawings.

DETAILED DESCRIPTION

Figure 1:
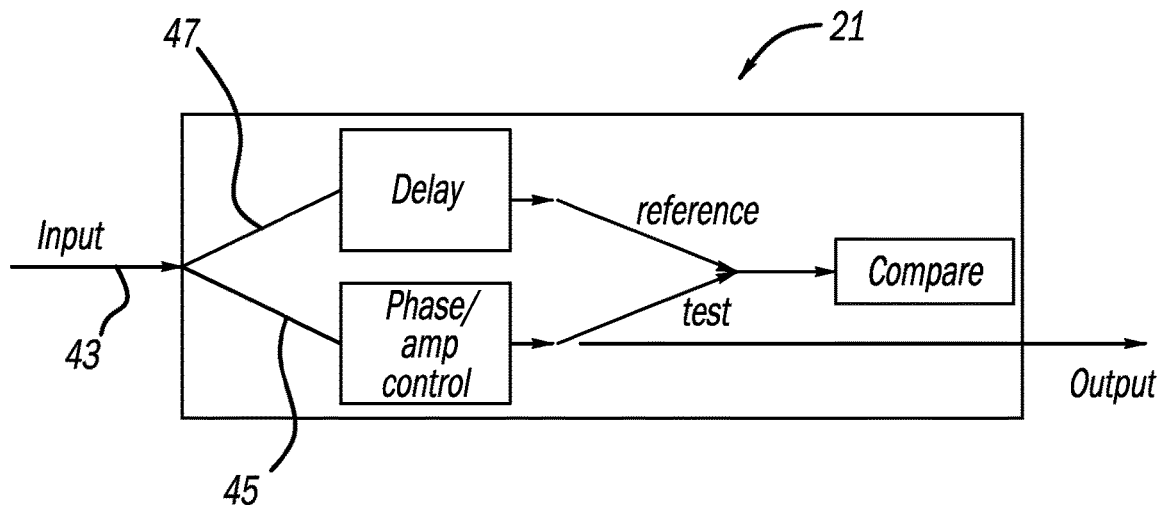
FIG. 1 is a diagrammatic view showing the function of the present laser system and pulse shaper.
Figure 2:
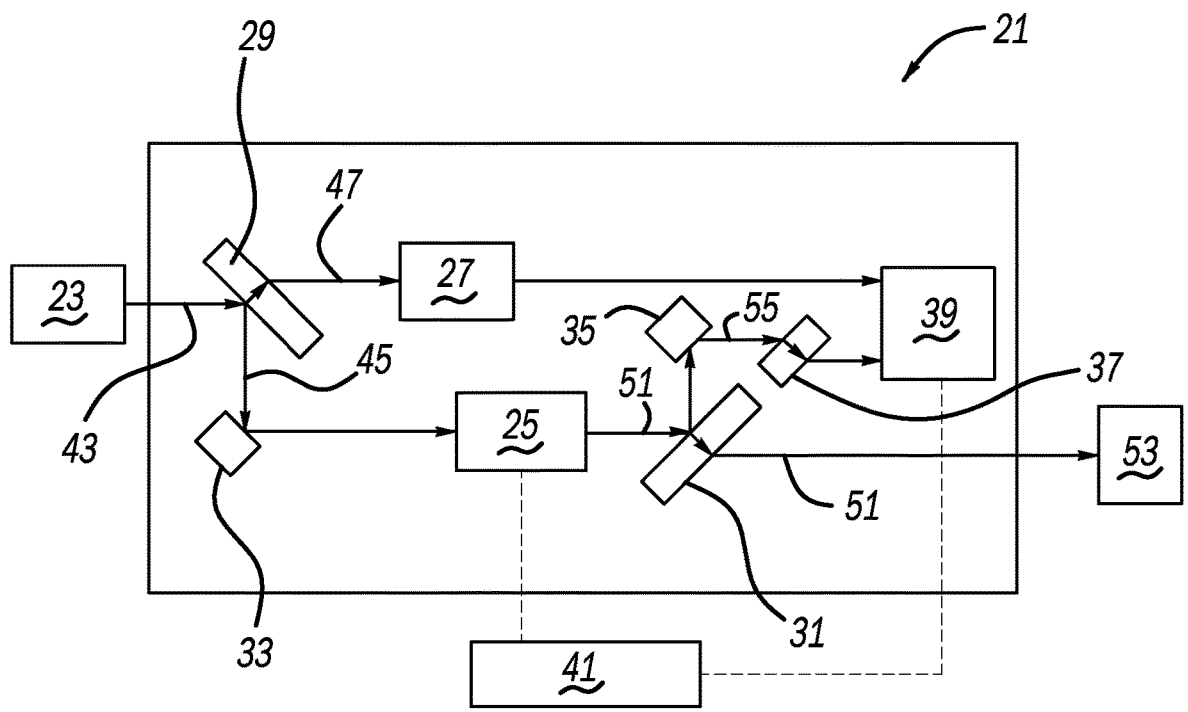
FIG. 2 is a diagrammatic view showing the structure of the present laser system and pulse shaper.

Referring to FIGS. 1 and 2, the preferred embodiment of a system 21 includes a laser 23, a programmable and adjustable pulse shaper 25, a delay optic 27, beam splitters 29 and 31, reflective mirrors 33 and 35, an anti-reflective and coated optic 37, a spectral interferometer 39 and a programmable computer controller 41. Laser pulses 43 of an input laser beam are emitted by laser 23, and each have a pulse duration of 1 picosecond or less. Beam splitter 29 preferably has a reflectance of approximately 99% and a transmittance of approximately 1%, and a broadband and anti-reflective coating on a side thereof, such that a majority of each input pulse 43 is reflected to a shaping path 45 received by pulse shaper 25, while a minority of each input pulse 43 passes therethrough along a reference or delay path 47 received by delay optic 27. Shaper 25 is preferably a 4f shaper with a one- or two-dimensional liquid crystal spatial light modulator ("SLM"), deformable mirror, acousto-optic modulator ("AOM") at the Fourier plane or an acousto-optic programmable dispersive filter ("AOPDF"). Shaper 25 is controlled by computer 41 to adjustably control phase and amplitude of pulses 45. The self-referenced pulse shaper is a phase-only, or phase and amplitude controller.

Mirrors 33 and 35 are preferably of a broadband dielectric type coated with a silver or gold reflective layer.

Furthermore, beam splitter 31 preferably provides a 1/99 split such that a majority of an output pulse 51 is transmitted to modify or interact with a workpiece 53, and a reflected minority creates a test path 55.

Test path 55 is reflected by mirror 35, passes through the thickness of glass optic 37, and is received by spectral interferometer 39. Workpiece 53 may be an eye or other body tissue in a surgical station, a transmitter and/or receiver in a communications station, a metal or polymeric part in a laser machining or cutting station, or the like.

Figure 4:
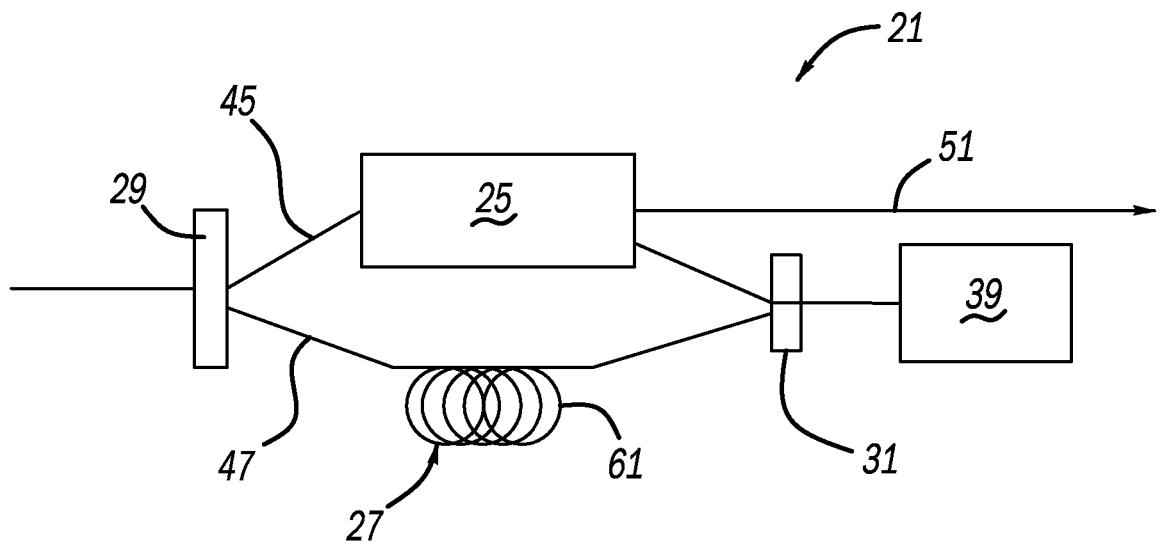
FIG. 4 is a diagrammatic view showing a fiber-based optical delay in the present laser system and pulse shaper.
Figure 5:
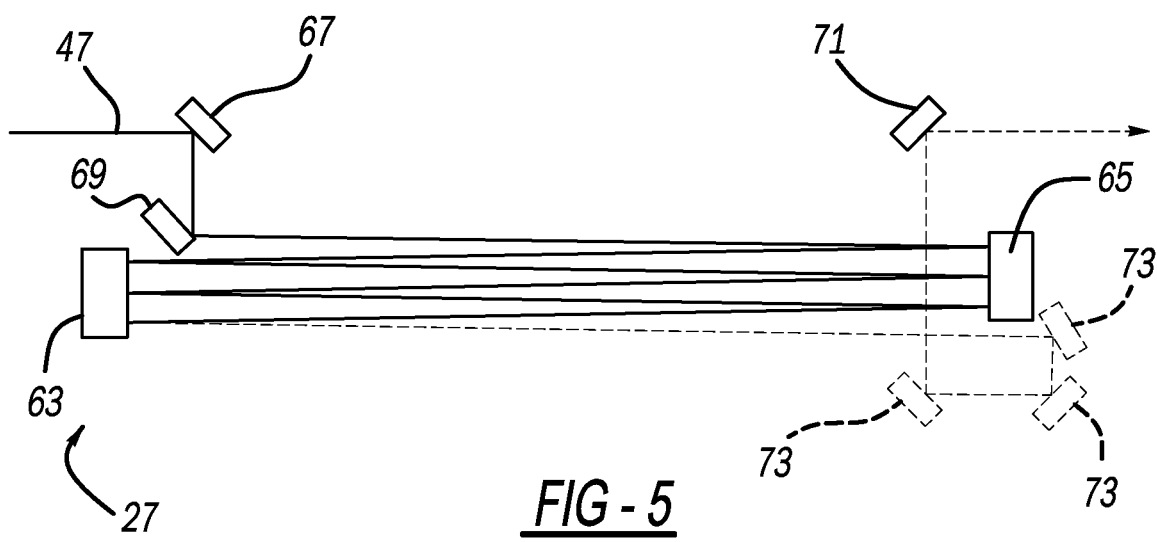
FIG. 5 is a diagrammatic view showing a mirror-based optical delay in the present laser system and pulse shaper.
Figure 6:
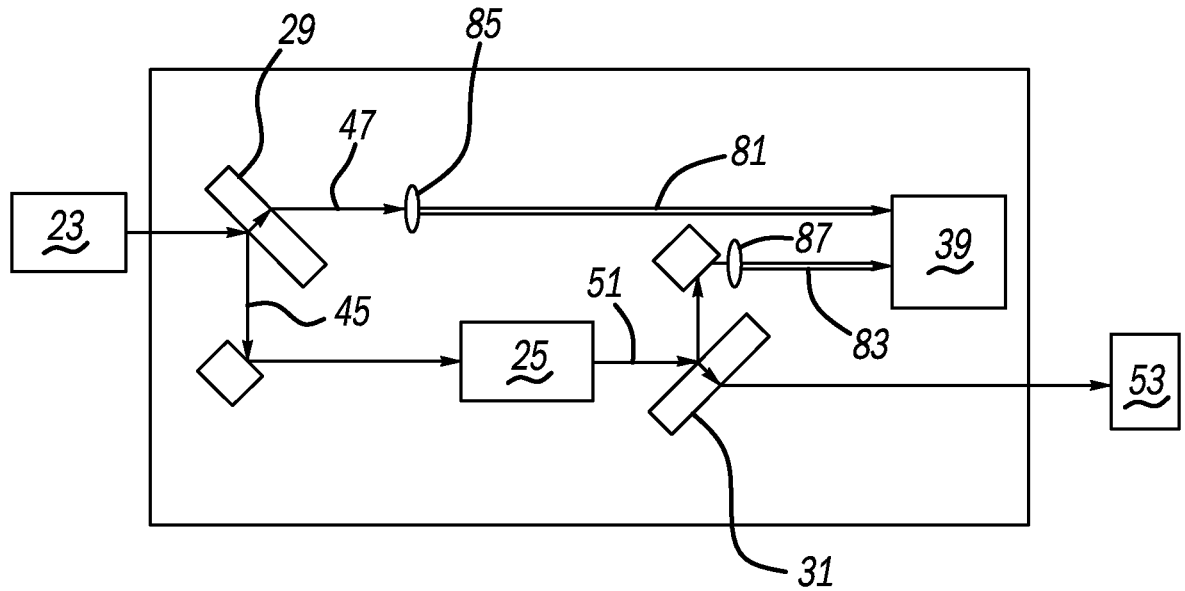
FIG. 6 is a diagrammatic view showing a hollow core fiber-based optical delay in the present laser system and pulse shaper.

Interferometer 39 is connected and sends output signals to computer controller 41. Simultaneously and in parallel with shaping path 45, a portion of the input pulses are sent along reference path 47 from splitter 29 to delay optic 27 and then on to interferometer 39. In the embodiment shown in FIG. 4, delay optic 27 employs a compact and coiled, optical fiber 61 having a length matching the delay of shaper 25. In the configuration illustrated in FIG. 5, delay optic 27 includes multiple parallel and stationarily fixed mirrors 63 and 65, between entry and exit diagonally angled mirrors 67, 69 and 71. Optionally, additional angled mirrors 73 may be used to add further delay. Mirrors 63 and 65 provide an optical path that matches the pulse shaper delay. FIG. 6 shows yet another variation of delay optic 27 which uses hollow-core fibers 81 and 83 between fiber couplers 85 and 87 on one end, and interferometer 39 on the other end. This hybrid hollow-core fiber delay is well suited for use with intense laser pulses.

Functionally, the present laser system samples a small portion of the input pulse entering the self-referenced spectral pulse shaper 25, designated as the reference pulse. The reference pulse is then compared with a small portion of the output pulse after it has traversed the phase control—shaper optics, which is designated as the test pulse. The reference pulse undergoes exactly the same amount of dispersion and optical path length delay, except for elements related to phase control, which are used to make the reference and test pulses identical.

The beam splitters 29 and 31 separate the beams. Furthermore, the compensating optics match the dispersion of the phase control and reference beam paths. The test and reference pulses are compared by computer 41 to extract phase and amplitude variations, which use the shaper as a phase and amplitude controller to subsequently compensate or correct them. Such compensation can be achieved by interferometry, such as spectral interferometry, spatial spectral interferometry, temporal interferometry or spatial temporal interferometry. Alternately, the compensation can be achieved by nonlinear intensity matching, such as matching SHG spectrum, matching SHG intensity, or matching two-photon fluorescence or two-photon signals from a photodiode or balancing two-photon signal from a pair of photodiodes. In the presently preferred example, spectral interferometry is employed by interferometer 39 given that it is a linear method that requires a minimal amount of laser intensity, is less sensitive to noise, and offers a direct measurement of the phase and amplitude differences between the test and reference pulses.

Figure 7:
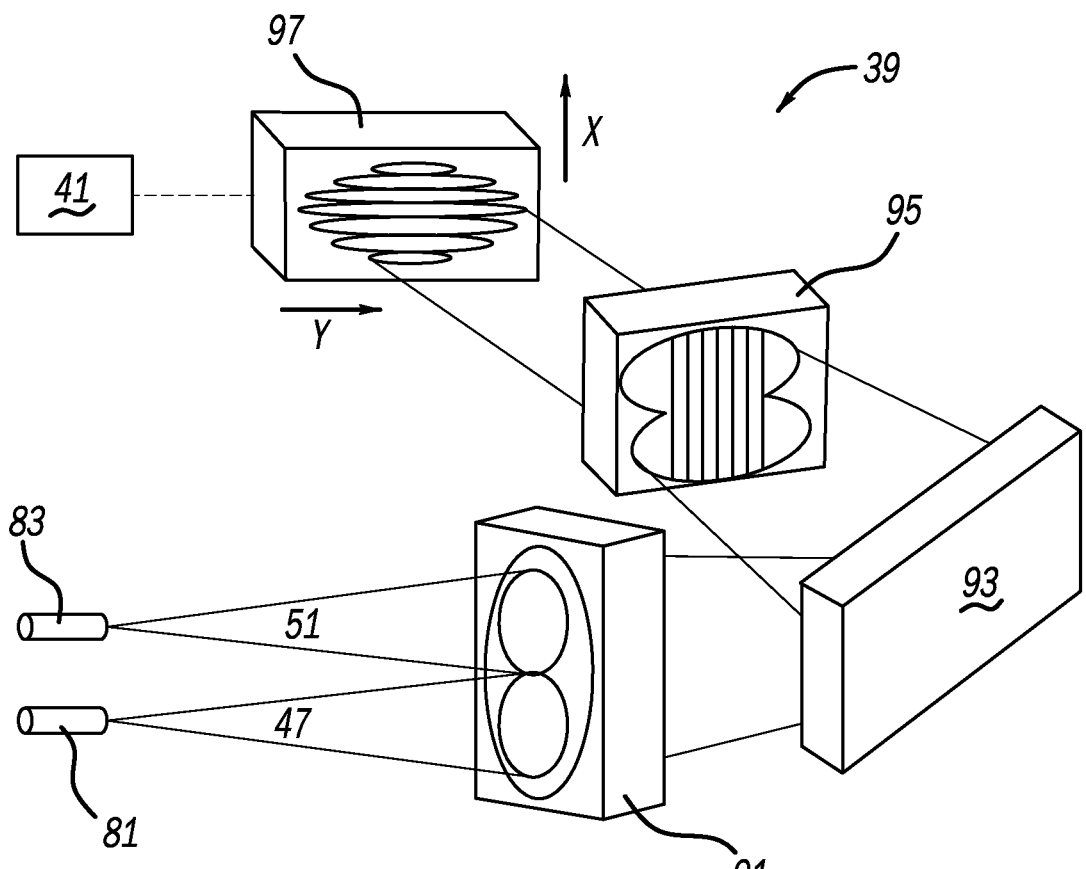
FIG. 7 is a diagrammatic perspective view showing the hollow core fiber-based optical delay in the present laser system and pulse shaper.

As can be observed in FIG. 7, the measurement is carried out by spectral interferometry where both test and reference pulses 51 and 47, respectively, emitted from fibers 83 and 81, pass through fixed pinholes or short optical fibers, and are focused by a common collimating lens 91. A grating 93 diffracts the pulses which are then collimated by a cylindrical lens 95, whereafter the pulses are received and measured by a CCD camera 97 of interferometer 39 to produce the wavelength-resolved interferogram. The camera output signals are transmitted to computer 41. Alternately, the two beams can be overlapped at their output and the results can be analyzed by Fourier transform of the spectral interference.

Figure 8:
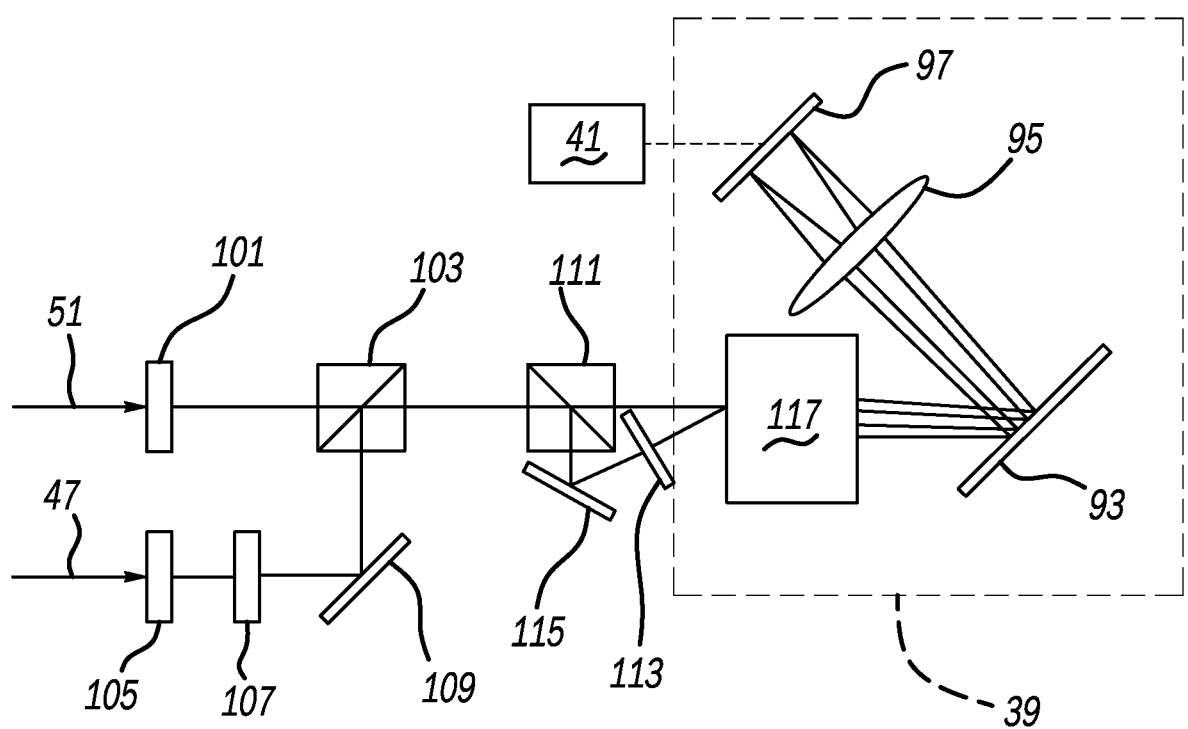
FIG. 8 is a diagrammatic view showing interferometric measurement in the present laser system and pulse shaper.

FIG. 8 illustrates implementation of interferometric measurement with quadrature interferometry in the present laser system. Test pulse 51 passes through a linear polarizer 101 and a beam splitter 103. In parallel, reference pulse 47 passes through a linear polarizer 105 and a quarter waveplate 107, for subsequent reflection by a mirror 109 to beam splitter 103. The pulses are then transmitted to a polarizing beam splitter 111, wherein a portion is sent to a half wavelength plate 113 via an intermediate mirror 115. If the reference pulse is of the same polarization as the test pulse then the reference pulse is transmitted through splitter 111, but it not, then it is sent to half wavelength plate 113. Beam expander optic lenses 117 transmit the pulses to grating 93, spectrometer 95 and then camera 97. The quadrature interferometry beneficially increases a range over which interference works which is ideally suited for the optical communications system.

An interferogram obtained between the reference and test outputs by interferometer 39 are analyzed by the computer 41 by using dual-quadrature or phase-shifting interferometry. Once the phase and amplitude variations between the test and reference pulses are measured, they can be minimized by automatically making adjustments in the programmable SLM shaper 25 so that it introduces a compensation phase to achieve the goal of having a zero-dispersion pulse shaper and a compensation amplitude mask to match the test and reference spectra.

Figure 3:
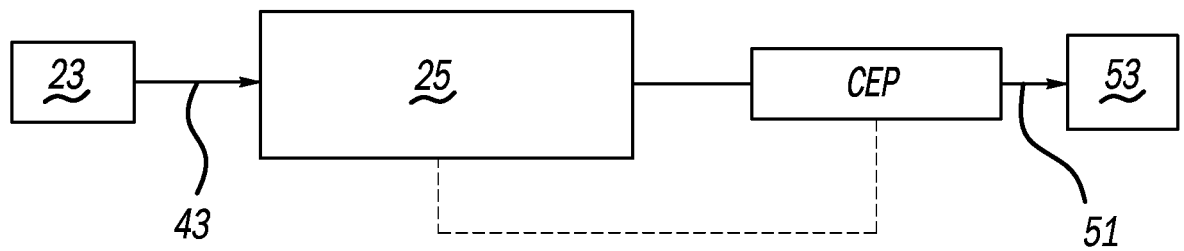
FIG. 3 is a diagrammatic view showing phase stabilization in the present laser system and pulse shaper.

In various optional aspects of the present laser system, the self-referenced spectral pulse shaper can be used for stabilizing a carrier phase envelope of output pulses, if an additional reference and an additional controllable adjustment are employed. Referring to FIG. 3, a carrier envelope phase ("CEP") measurement is provided between an output from shaper 25 and output pulse 51 which passes to workpiece 53. This counters drift in CEP. This adjustment is very fast and therefore hardwired to the phase controller if it is faster than 10 kHz, or hardwired to a piezoelectric actuator on a mirror if the phase controller is slower than 10 kHz.

The present laser system advantageously can speed up routine performance by comparing the measured interferogram with a calculated interferogram. This reduces the computation time needed for converting the measured interferogram into a phase and then comparing same to the expected phase. Similarly, the system can save the interferogram in computer memory after self-referencing, and then using that data to determine if the system is still performing optimally or if a new self-referencing update is required. For alternate applications where the output of the pulse shaper is used following highly dispersive optics, such as a microscope objective, a similar microscope objective can optionally be used before the interferogram to obtain the spectral phase that is delivered to the workpiece.

Figure 9:
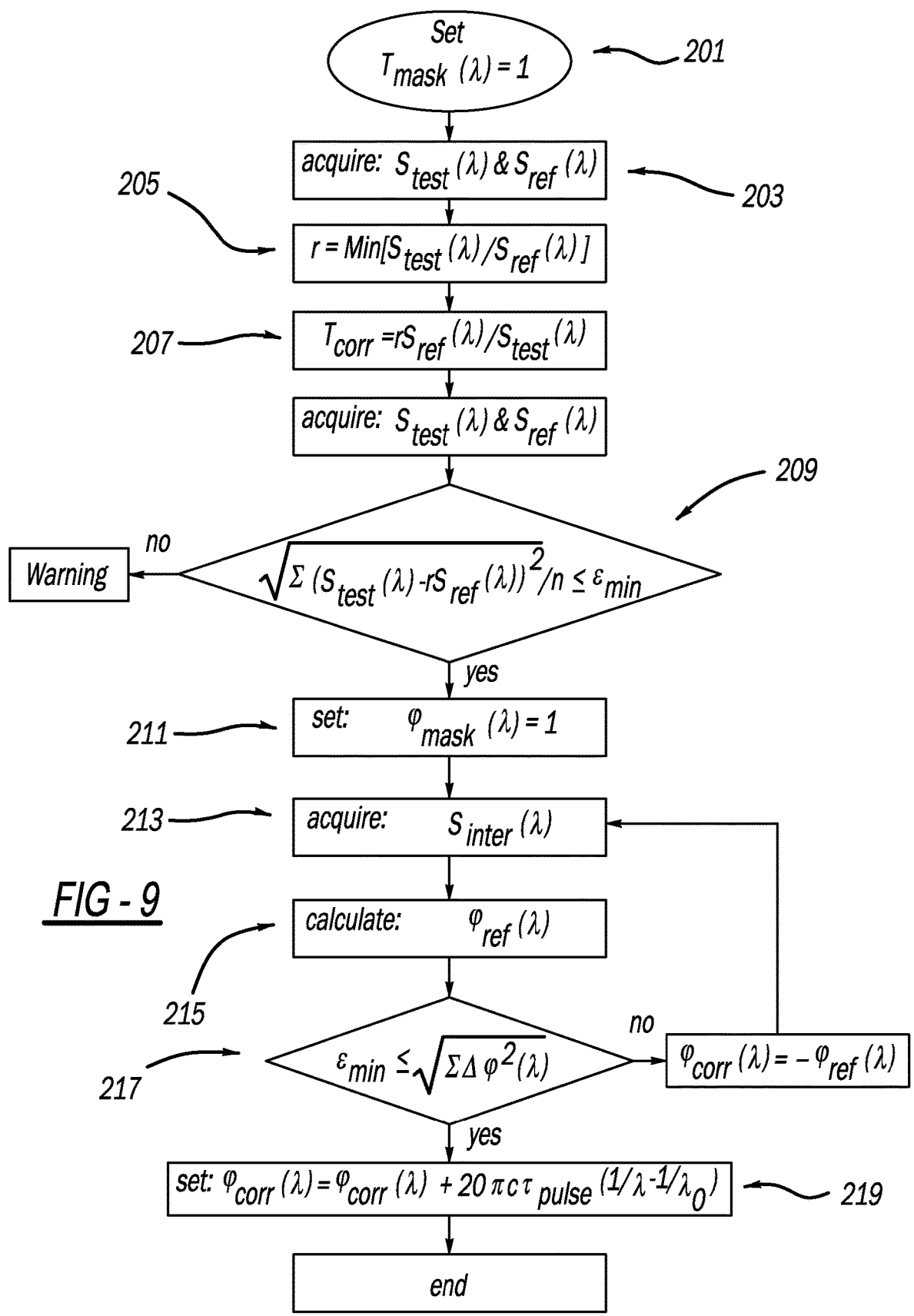
FIGS. 9 and 10 are software flow diagrams used in the present laser system and pulse shaper.

Referring now to FIG. 9, the present self-referencing laser system can be calibrated during its manufacture, upon installation, or any time the system has been adjusted in any way. In the programmed software instructions shown therein, implemented by a microprocessor of the computer controller, the phase and transmission corrections in the pulse shaper are calibrated with the goal of making them equal expect for a desired delay (preferably of ten pulse durations). In the "set" step 201, the transmission is set for each pixel without any correction. In the "acquire" step 203, each spectrum is acquired separately without interference. Step 205 equalizes the spectra between the two paths, and step 207 obtains the necessary transmission setting so that the two spectra match within a ratio across the spectrum.

A calculation and determination is made at step 209 as to whether the laser is working correctly.

Subsequent "set" step 211 sets the phase for each pixel without any correction, "acquire" step 213 looks at interference acquired from the interferometer, and "calculate" step 215 calculates the phase difference between the test and reference pulses. Then step 217 determines if the calculated value is greater than the mean, and if so, causes correction of same at step 219. Step 219 obtains the necessary phase correction so that the phase difference between the test and reference pulses equals a delay (preferably ten pulse durations), which is ideal for phase characterization. After this software routine is run, the phase and amplitude controller acquires a transmission correction and a phase correction; therefore, the test and reference beams of the self-referencing shaper will have identical spectrum and phase, set to a delay (preferably of ten time pulse duration) when phase control is set to zero and the amplitude is set to one.

When the present system is being manufactured or when the system needs to be calibrated independently from the laser, it can be calibrated by using any type of light source including an incoherent light source, such as a light-emitting diode (i.e., incoherent collimated light source) and calibrated at any desired wavelength without the need for a more expensive femtosecond laser. This is beneficial because there is no need to have a femtosecond laser with exactly the needed output spectrum to build and calibrate the pulse shaper, thereby reducing expense. Moreover, during the phase and amplitude calibration routine, the interferogram can inform about the distance of the phase and amplitude controller and the reference pathways. The two pathways need to be approximately the same distance, but not zero.

The preferred delay between the pulses in the two paths needs to be such that $2\omega_0\tau_{pulse} < \tau_{pulse} < 20\omega_0\tau_{pulse}$, where $\omega_0$ is the carrier or average frequency of the light and $T_{pulse}$ is the pulse duration which is related to the bandwidth of the light by the time-bandwidth product. This can be translated into distance by multiplying the speed of light. Hence, the transmission spectrum of the phase and amplitude controller can also be adjusted during manufacturing with the need of a laser.

Figure 10:
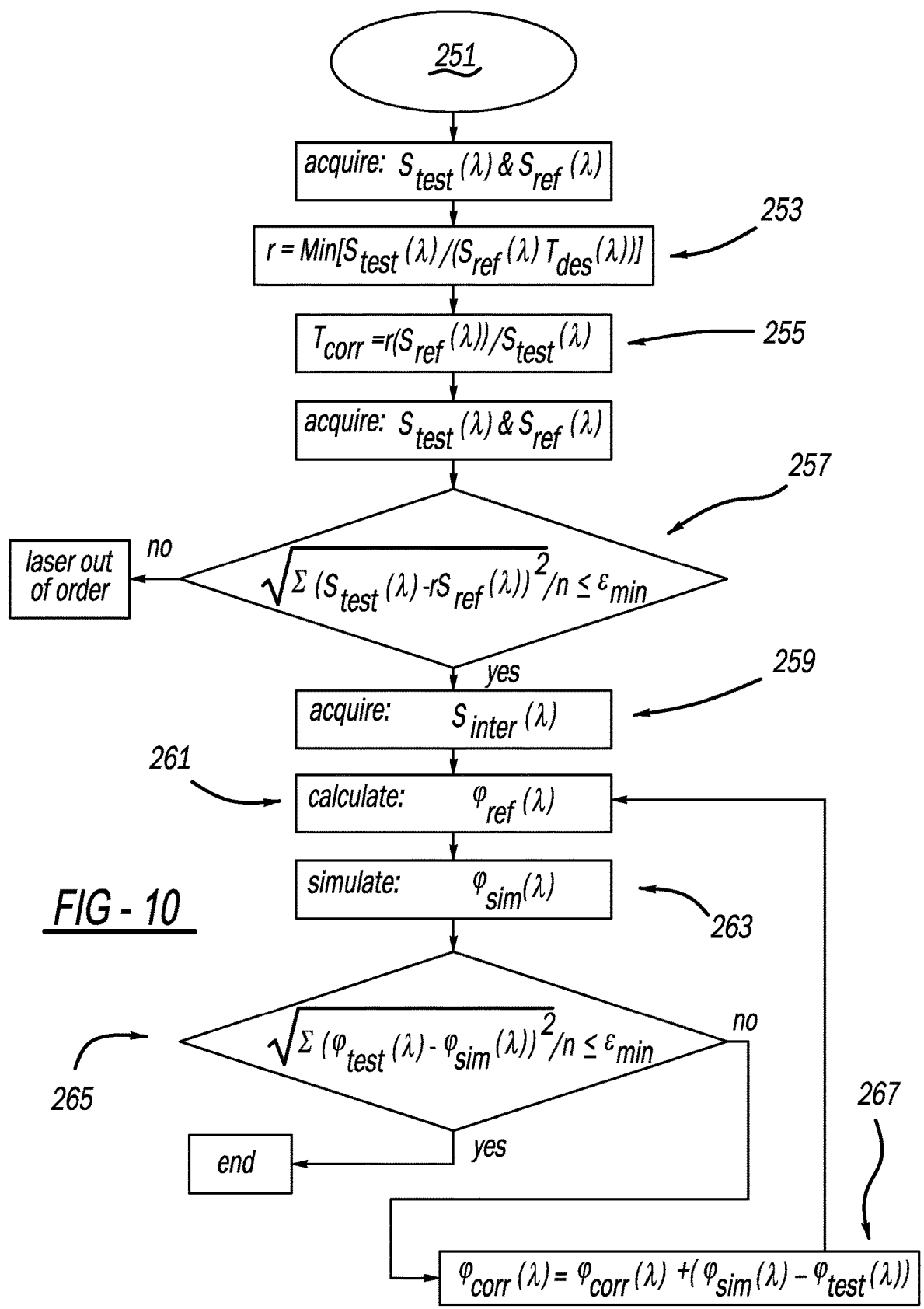

Software program instructions for continuous monitoring of the present laser system can be seen in FIG. 10. At the initial step 251, the system is operating on phase and amplitude settings that are equal to the desired setting (des) plus the correction settings from the calibration routine. Step 253 equalizes the spectra between the two paths and step 255 applies a correction to adjust the transmission. In step 257, proper functioning of the laser or light source is calculated and determined. In the subsequent steps 259, 261 and 263, respectively, the interferometer interference is acquired, a fast Fourier transform is calculated, and a simulation is conducted based on a laser pulse with a desired phase and amplitude. Step 265 calculates and determines if the phase and amplitude being delivered are accurate, and if not, automatically adjusts the phase at step 267. This software routine can run continuously or intermittently at regular intervals during regular on-site commercial use for workpiece interaction.

Optionally, phase optimization may be performed by the present laser system to mitigate effects of phase wrapping. When implementing spectral phase functions with values in tens or even hundreds of n, the output of the phase controller may show some deviations from the desired phase output. This deviation will be apparent by comparing the measured interferogram to the calculated interferogram. The deviations should be minimized by adding a phase correction of the form: $\varphi_{corr}(\lambda) = \varphi_{corr}(\lambda) + a + b\lambda$ where a and b are a constant and a linear term that can be added that has no effect on the output pulse duration but may improve the output phase. The value for a and b are preferably calculated by the following programmed instruction steps:

Upload the spectral phase from the controller;
Unwrap the spectral phase;
Fit the spectral phase with a line of intercept a and slope b;
Subtract a from the entire spectral phase;
Multiply the spectral phase by (1/b); and
Send the optimized phase to the controller for use in varying subsequent pulses.

In summary, the self-referencing allows the present pulse shaper to calibrate itself or adjust to a state of true zero-dispersion, which greatly simplifies its production, alignment, installation, maintenance and monitoring of its performance especially at a commercial manufacturing site. When it corrects the output pulses to deliver transform-limited pulses (using MIIPS® or other forms of pulse characterization), the action is essentially charactering the input pulses. Once the phase correction is known from the characterization, the present shaper is configured to store the phase correction and optionally, use this data to monitor the desired output TL or more accurately shape subsequent pulses. The present controller and software instructions automatically analyze the interferogram and determine if the results are within or outside the desired range, and within or outside of the instrument's capabilities. Therefore, the present pulse shaper can beneficially monitor the input pulses in addition to monitoring its own performance.

One can use the feedback to monitor the performance of the laser system as follows: (a) having the shaper produce transform limited pulses at the workpiece (such as by running any type of algorithm, such as MIIPS); (b) obtaining the interferogram from comparing the test and reference beams; and (c) considering this interferogram as the representation of the baseline phase and is stored as a reference in the controller. During operation, when a desired phase is introduced by the pulse shaper the new interferogram can confirm that the output has the desired phase by comparing it to the resulting interferogram of the new phase plus the baseline phase. This comparison is done by the software instructions in the controller which calculates the expected interferogram by adding the desired phase to the baseline phase and comparing it to the present interferogram. Optionally, the present system can be used to check the performance of the input laser by testing if it still delivers transform-limited pulses by introducing the baseline phase obtained hereinabove at (a)-(c). If an additional correction is needed, it implies that the input laser has changed.

While various configurations have been disclosed hereinabove, additional variations may be employed with the present laser system. For example, additional or different optic components may be used with the present system, although certain advantages may not be realized. Furthermore, additional, or modified software steps may be provided, although some benefits may not be achieved. Structural and functional features of each embodiment may be interchanged between other embodiments disclosed herein, and all of the claims may be multiply dependent on the others in all combinations. It is intended by the following claims to cover these and any other departures from the disclosed embodiments which fall within the true spirit and scope of the present invention.

The invention claimed is:

1. A method of using a laser system comprising:
   (a) emitting an input light beam;
   (b) splitting the light beam into an input reference path and a shaping path;
   (c) shaping the light beam along the shaping path;
   (d) delaying the light beam along the input reference path;
   (e) conducting interferometry on the shaped and delayed light beams;
   (f) comparing the shaped and delayed light beams to extract phase and amplitude variation information of the shaped and delayed light beams;
   (g) automatically compensating for variations by adjusting the shaping path to achieve zero-dispersion introduced by the shaping path; and
   (h) transmitting an output light beam from the shaping path, configured for workpiece interaction.

2. The method of claim 1, wherein the input light beam includes laser pulses, and the shaping is performed by a programmable pulse shaper.

3. The method of claim 2, wherein the shaper is a spatial light modulator automatically controlled by a programmable computer, and the computer compares a measured interferogram to a calculated interferogram and minimizes the variations by adding a phase correction to the shaper.

4. The method of claim 1, further comprising a programmable controller continuously monitoring the shaped and delayed light beams which include laser pulses, equalizing spectra between the shaped and delayed laser pulses, calculating an adjustment transmission value, causing a shaper to perform the compensating step, determining if a laser is faulty, and conducting a simulation based on the input light beam with desired phase and amplitude.

5. The method of claim 1, further comprising a programmable controller calibrating phase and transmission corrections in a pulse shaper which performs the shaping step, the calibrating comprising:
   (a) ascertaining a transmission setting without any correction;
   (b) acquiring spectra reference spectrum and a test spectrum separately without interference;
   (c) equalizing both of the spectra; and
   (d) obtaining a transmission setting to match the spectra of the input paths.

6. The method of claim 1, further comprising a transmission correction and a phase correction being sent to a self-referencing shaper which controls a phase and amplitude of the output light beam so that the shaped and delayed light beams of the shaper have identical spectrum and phase.

7. The method of claim 1, further comprising:
   (a) a spectral interferometer performing the interferometer step, the spectral interferometer sending output signals to a programmable controller;
   (b) a laser performing the emitting step, the input and output light beams comprising laser pulses;
   (c) an adjustable shaper performing the shaping step, the programmable controller adjusting the shaper;
   (d) a first beam splitter performing the splitting step; and
   (e) a second beam splitter splitting the output light beam from a test path, the second beam splitter being located between the shaper and the spectral interferometer.

8. The method of claim 1, further comprising:
   (a) an interferometer performing the interferometer step;
   (b) an adjustable pulse shaper controlling phase and amplitude of the input light beam which includes laser pulses, the shaper performing the shaping step;
   (c) a programmable computer connected to the shaper and the interferometer;

(d) characterizing the input light beam, monitoring dispersion and alignment of the shaper, and providing accurately shaped pulses in the output light beam; and (e) matching a carrier-envelope phase of a phase-reference at a workpiece.

9. The method of claim 1, further comprising:

introducing at least one of: a phase function or an amplitude function, to the light beam which is at least one laser pulse, via a programmable pulse shaper;

monitoring test and reference interference; and adjusting the pulse shaper to cause the test beam to have a desired phase and amplitude.

10. The method of claim 1, further comprising breaking the input light beam, which is a laser pulse, into at least ten output laser pulses with a programmable pulse shaper.

11. A method of using a laser system comprising:

(a) splitting an input laser pulse into a reference subpulse and a test subpulse;

(b) controlling phase and amplitude of the test subpulse with an adjustable pulse shaper;

(c) creating an optical delay of the reference subpulse;

(d) comparing the test subpulse, which is split from an output working pulse, and the reference subpulse after the delay;

(e) the laser system characterizing the input laser pulse and monitoring the pulse shaper's own dispersion in a self-referenced manner based at least in part on the comparison; and (f) correcting a subsequent output working laser pulse.

12. The method of claim 11, wherein the pulse shaper is adjustable and automatically controlled by the programmable computer, and the computer compares a measured interferogram to a calculated interferogram and minimizes the variations by adding a phase correction to the pulse shaper.

13. The method of claim 11, further comprising a programmable controller continuously monitoring the test and reference subpulses, equalizing spectra between the test and reference subpulses, calculating an adjustment transmission value, causing the pulse shaper to perform the correcting step, determining if a laser is faulty, and conducting a simulation based on the input laser pulse with desired phase and amplitude.

14. The method of claim 11, further comprising a programmable controller calibrating phase and transmission corrections in the pulse shaper, the calibrating comprising:

(a) ascertaining a transmission setting without any correction;

(b) acquiring each spectrum separately without interference;

(c) equalizing spectra between subpulse input paths;

(d) obtaining a transmission setting to match the spectra of the input paths; and (e) calculating a phase correction so a phase difference between the input paths equals the delay.

15. The method of claim 11, further comprising sending a majority of the shaped pulse to interface with a workpiece.

16. The method of claim 11, wherein the pulse shaper performs pulse compression and the laser system characterizes the input pulse to the shaper, monitors its own dispersion and alignment, and provides accurately shaped ones of the subsequent output working laser pulse.

17. A method of using a laser system comprising:

(a) emitting input light pulses from a laser;

(b) splitting the light beam into an input reference path and a shaping path;

(c) shaping the light beam along the shaping path, using a programmable pulse shaper;

(d) delaying the light beam along the input reference path;

(e) conducting interferometry on the shaped and delayed light beams;

(f) comparing the shaped and delayed light beams to extract phase and amplitude variation information of the shaped and delayed light beams;

(g) comparing a measured interferogram to a calculated interferogram and minimizing variations by adding a phase correction to the shaper;

(h) automatically compensating for the variations by adjusting the shaping path to achieve zero-dispersion introduced by the shaping path; and (i) transmitting an output light beam from the shaping path, configured for workpiece interaction.

18. The method of claim 17, further comprising a programmable controller continuously monitoring the shaped and delayed light beams which include laser pulses, equalizing spectra between the shaped and delayed laser pulses, calculating an adjustment transmission value, causing a shaper to perform the compensating step, determining if a laser is faulty, and conducting a simulation based on the input light beam with desired phase and amplitude.

19. The method of claim 17, further comprising a programmable controller calibrating phase and transmission corrections in a pulse shaper which performs the shaping step, the calibrating comprising:

(a) ascertaining a transmission setting without any correction;

(b) acquiring spectra reference spectrum and a test spectrum separately without interference;

(c) equalizing both of the spectra; and (d) obtaining a transmission setting to match the spectra of the input paths.

20. The method of claim 17, further comprising a transmission correction and a phase correction being sent to a self-referencing shaper which controls a phase and amplitude of the output light beam so that the shaped and delayed light beams of the shaper have identical spectrum and phase.

21. The method of claim 17, further comprising breaking the input light beam into at least ten output laser pulses with the programmable pulse shaper.

* * * * *